United States Patent [19]

Thwaites et al.

[11] 4,273,239

[45] Jun. 16, 1981

[54] ZERO PRESSURE ACCUMULATOR AND BRAKING APPARATUS THEREFOR

[75] Inventors: John A. Thwaites, Jackson; Ronald A. Ferrara, Englishtown, both of N.J.

[73] Assignee: Contran Conveyors & Systems, Inc., Rahway, N.J.

[21] Appl. No.: 32,654

[22] Filed: Apr. 23, 1979

[51] Int. Cl.³ .................. B65G 13/071; B65G 13/075
[52] U.S. Cl. ..................................... 198/781; 198/790
[58] Field of Search ................................. 198/781, 790

[56] References Cited

U.S. PATENT DOCUMENTS

| | | | |
|---|---|---|---|
| 3,724,642 | 4/1973 | De Good | 198/781 |
| 4,174,777 | 11/1979 | Riehle | 198/781 |
| 4,219,115 | 8/1980 | Moore | 198/781 |

Primary Examiner—James L. Rowland
Attorney, Agent, or Firm—Martin Sachs

[57] ABSTRACT

A zero pressure accumulator conveyor includes a combination propelling and braking apparatus which is operatively coupled to a plurality of sections arranged in tandem. The combination propelling and braking apparatus is shiftable to either simultaneously engage a plurality of article supporting rollers of the conveyor or simultaneously disengage a plurality of article supporting rollers, thereby preventing contact between articles moving along the conveyor.

18 Claims, 11 Drawing Figures

ZERO PRESSURE ACCUMULATOR AND BRAKING APPARATUS THEREFOR

BACKGROUND OF THE INVENTION

1. Field of the Invention

The present invention relates to a zero pressure accumulator conveyor and, more particularly, to an accumulator conveyor in which delivery or non-delivery of the propelling force to the article is pneumatically controlled and applied to a plurality of article supporting rollers simultaneously.

2. Description of the Prior Art

The use of expansible tube means in combination with a pressurized pneumatic system has been known in the prior art for controlling the propulsion of articles along a conveyor system. This type of system is disclosed in U.S. Pat. No. 3,770,102 issued to DeGood on Nov. 6, 1973. The patent to DeGood discloses an accumulator conveyor having a powered propelling member passing through a plurality of independent operating zones arranged in tandem along the conveyor. In each zone the propelling member is shiftable between an article propelling and an article non-propelling position by pneumatically actuated pressure rollers acting on a propelling member. A valve operated by an article detecting sensor in each zone, operates a supply or exhaust fluid pressure to the actuators. An auxiliary valve system connected between the secondary pressure source and the actuators operates to shift all of the operating zones into an article propelling position, thereby overriding the accumulative function of the conveyor.

In U.S. Pat. No. 3,724,642 issued to DeGood on Apr. 3, 1973, there is disclosed a powered roller accumulator similar to the one discussed above. However, the patent also discloses a brake means which engages the powered rollers in order to stop the rotation when the propelling member is shifted to a non-driving position, thereby preventing movement of articles along the conveyor.

However, both of the disclosed systems apply a braking apparatus to a singular roller in each tandem section of the conveyor. If additional rollers are to be afforded braking pressure, the mechanism must be duplicated at various positions in each section. Thus, the braking device as disclosed is unable to be applied to a plurality of article carrying rollers simultaneously. An article moving on the conveyor will not be stopped until it reaches the braking roller, and thus, an article traveling behind the first article will come into contact therewith, and apply pressure thereto in order to be stopped. It can be readily seen that the braking roller would be required to be spaced a distance apart that is less than the dimension of the article being propelled along the conveyor, in order to reduce the amount of pressure between articles that are stopped. The cost and inconvenience of providing a large quantity of braking rollers is readily overcome with the use of the instant invention.

In U.S. Pat. No. 3,323,636 issued to Gotham on June 6, 1967, there is disclosed a power driven roller conveyor which is driven from below by a moving belt urged into contact with the rollers by spring-actuated pulleys which limit the frictional driving force on the several driven rollers. The rollers require continual adjustment in order to insure the proper amount of frictional contact between the moving belt and the rollers, since the spring tension varies with time and teperature. A braking means for stopping the moving articles on the conveyor is not disclosed therein.

SUMMARY OF THE INVENTION

The instant invention overcomes the shortcomings found in the prior art by providing a means for applying braking pressure to all of the article carrying rollers in a section uniformly, and also provides a means for applying uniform pressure to all the article carrying rollers when the conveyor is in its conveying mode. Thus, a relatively simple inexpensive apparatus is available, which may be affixed to a conventional accumulating conveyor known in the art. This apparatus is capable of applying simultaneous braking ad simultaneous propelling action to the accumulating conveyor without requiring contact between articles traveling on the conveyor in order to have them come to rest.

A zero pressure accumulator conveyor, according to the principles of the present invention, comprises a plurality of sections arranged in tandem, each section includes a pair of side rails and a plurality of article supporting rollers at spaced intervals therebetween. Driving means which includes a combination driven propelling and braking apparatus is operatively coupled to the article supporting rollers and is disposed on one of the side rails. Also included is a pressurized fluid source and a reversible article detecting sensor disposed in each of the sections. The reversible article detecting sensor is operatively coupled to the pressurized fluid source and the combination propelling and braking apparatus to either simultaneously engage or simultaneously disengage the combination propelling and braking apparatus from a plurality of the article supporting rollers.

Also disclosed herein is a method of propelling and stopping articles on a zero pressure accumulator conveyor system, having a plurality of article supporting rollers, a driven propelling and braking apparatus affixed upon each section of the accumulator conveyor, a source of pressurized fluid, an article detecting sensor in each section, and a driving source comprising the steps of sensing an article leaving the first section of the conveyor by the detecting sensor, permitting pressurized fluid to enter the expansible member of the propelling and braking apparatus in a second section just rearward of the first section, driving simultaneously all of the article supporting rollers in the second section until another article leaves the second section and arrives at the first section sensor, permitting the pressurized fluid to leave the expansible member of the propelling and braking apparatus in the second section when an article in the first section is detected by the detecting sensor therein, and braking simultaneously all of the article supporting rollers in the second section, and stopping an article which has entered the second section of the conveyor.

BRIEF DESCRIPTION OF THE DRAWING

In order that the invention may be more fully understood, it will now be described, by way of example, with reference to the accompanying drawing, in which.

DESCRIPTION OF THE PREFERRED EMBODIMENTS

Figure 1:
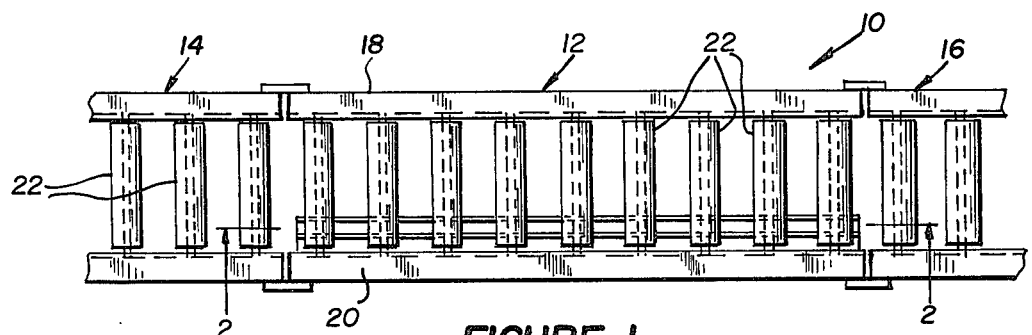
FIG. 1 is a top plan view of the roller conveyor incorporating the principles of the present invention.
Figure 2:
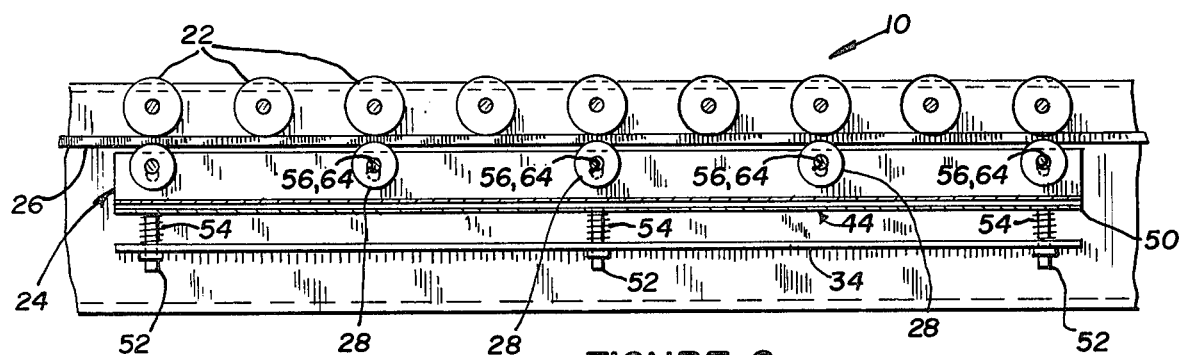
FIG. 2 is a slightly enlarged elevational view taken along the line 2—2 of FIG. 1.

Referring now to the figures, and in particular to FIGS. 1 and 2 which discloses a zero pressure accumulator conveyor 10, according to the principles of the present invention. The accumulator conveyor 10 is made up of a plurality of sections 12, 14 and 16 which are identical in construction and arranged in tandem. Each section 12 includes a pair of side rails 18 and 20 and a plurality of article supporting rollers 22 journaled at spaced intervals therebetween along the length thereof. Also included is a driving means 24 which includes a source of motivating power not shown, operatively coupled to a driving belt means 26 which will be discussed in more detail hereafter. The driving belt means 26 is arranged to be in intimate contact with the pulleys 28 of a combination driven propelling and braking apparatus 30.

The propelling and braking apparatus 30 has two separate and independent modes of operation, one being the propelling mode wherein the driving belt means 26 is caused to come into intimate frictional contact with the article supporting rollers 22 thereby propelling an article appearing on the conveyor 10 along the length of the conveyor and a second or braking mode wherein the article supporting rollers are in intimate frictional contact with a braking material 32 provided on the propelling and braking apparatus 30. In a preferred embodiment of the present invention, a mounting bracket 34 is affixed to one side rail 20 of the conveyor 10 by means such as a threaded bolt 36 in a conventional manner, and is preferably arranged to be perpendicular to the side rail 20. The mounting bracket 34 is provided with a plurality of apertures 38 spaced along its length which are adapted to receive oilite bushings 40 therein. A stiffening bracket 42 may be utilized at spaced intervals along the side rails 18 and 20 in order to insure that the side rails remain in a fixed vertical position, equally spaced down the length thereof.

A U-shaped bracket 44 which may be made to extend the entire length of the side rails or any portion thereof, is positioned to have its arms 46 extend upwardly towards the article supporting rollers 22. One or both of the arms of U-shaped bracket 44 is provided with an extending portion 48 on to which is affixed a braking material 32, in a conventional manner. The braking material 32 may be either rubber, asbestos, or any other material which is capable of providing frictional braking power with a minimum of wear associated therewith. The bottom portion 50 of the U-shaped bracket 44 is provided with a downwardly extending shaft 52 adapted to be received by the bushings 40 in mounting bracket 34. A spring means 54 is disposed between the mounting bracket 34 and the underside of the bottom portion 50 of the U-shaped bracket 44. Preferably the shaft 52 is welded to the bottom portion 50. However, any other means of affixing the shaft 52 to U-shaped bracket 44 is acceptable as long as the upper surface of the bottom portion 50 remains essentially flat. The reason for this will become obvious shortly. The arms 46 of U-shaped bracket 44 is provided with a plurality of elongated slots 56 equally spaced along the length thereof. The slots 56 extend upwardly and are adapted to receive the axle 58 of pulley 28, so that it may freely rotate therein and/or move in a vertical direction.

A second U-shaped bracket 60 having arms 62 is made slightly smaller than U-shaped bracket 44 and is adapted to fit into the open portion thereof, and extend its entire length. The arms 62 are provided with holes 64 which coincide with the slots 56 in U-shaped bracket 44, and also are adapted to receive the axle 58 of the pulley 28. A bearing may be included in hole 64.

Figure 3:
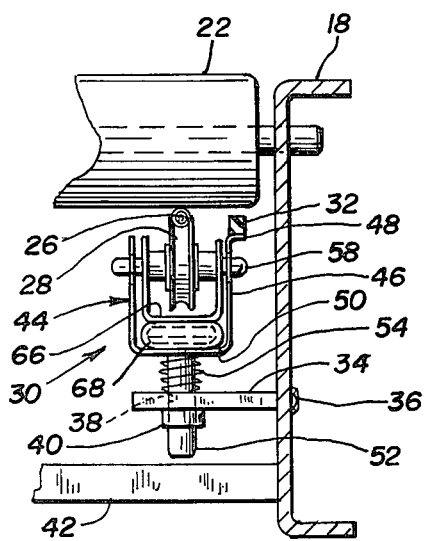
FIG. 3 is an enlarged partial view in elevation of the propelling and braking apparatus of the instant invention in its propelling position.
Figure 4:
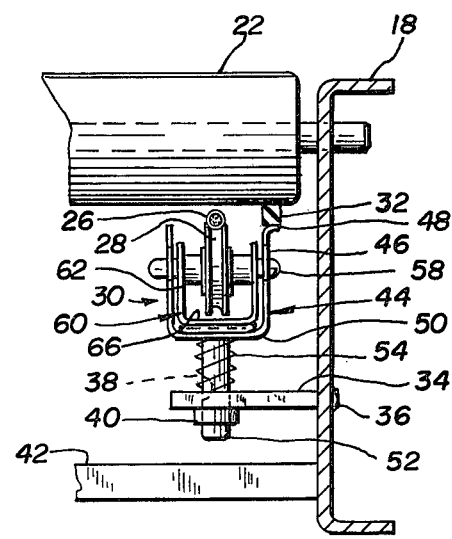
FIG. 4 is a view similar to that shown in FIG. 3, except that the apparatus is in its braking mode of operation.
Figure 11:
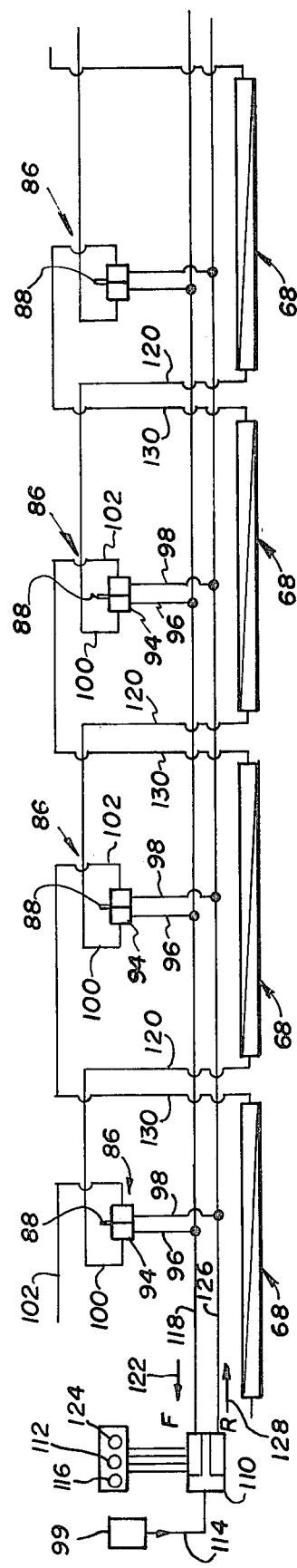
FIG. 11 is a pneumatic control schematic illustrating the basic pneumatic pressure system of this invention.

Disposed between the upper surface of the bottom portion 50 of U-shaped bracket 44 and the bottom portion 66 of U-shaped bracket 60 is an expansible tube 68 which is shown in its expanded position in FIG. 3 and its collapsed position in FIG. 4. If a reversible system is to be utilized, an expansible tube member having two independent chambers adapted to receive fluid, is required. The function of the separate air chambers will be described in more detail in conjunction with the description of the pneumatic operation of the system as shown in FIG. 11.

Figure 5:
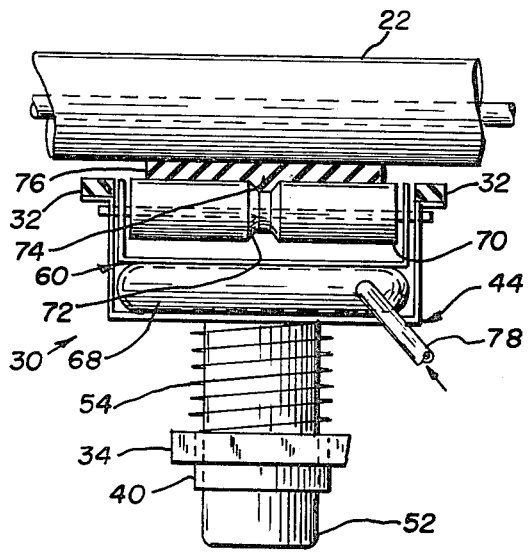
FIG. 5 is an enlarged partial view of an alternate embodiment of a propelling and braking apparatus according to the principles of the present invention, in its propelling moe.
Figure 6:
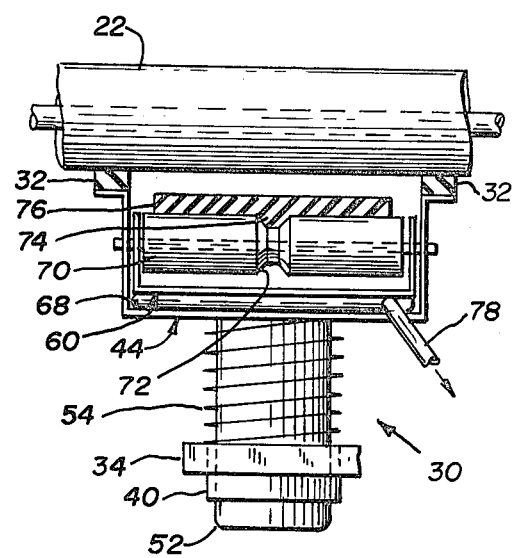
FIG. 6 is a view similar to that shown in FIG. 5 with the propelling and braking apparatus shown in its braking mode.

An alternative embodiment of the propelling and braking apparatus is shown in FIGS. 5 and 6, which is similar to the embodiment shown in FIGS. 3 and 4, except that a revision is made on the pulley 70, which is expanded to the length of a roller that is provided with a peripheral groove 72, which is adapted to receive an extending protusion 74 provided on the underside of the endless flat belt 76. The endless flat belt 76 is driven from a source of energy, not shown, and is adapted to cooperate with the pulley 70 and come into intimate frictional contact with the article supporting rollers 22 when urged upwardly by the expansion of the expansible tube 68 when it is inflated with fluid, such as air, via the inlet tube 78. The other features of construction are identical to the construction of the embodiment shown in FIGS. 3 and 4. It is to be noted, however, that a braking material 32 is provided on both upwardly extending arms of U-shaped bracket 44 in order to provide more frictional braking power.

Figure 7:
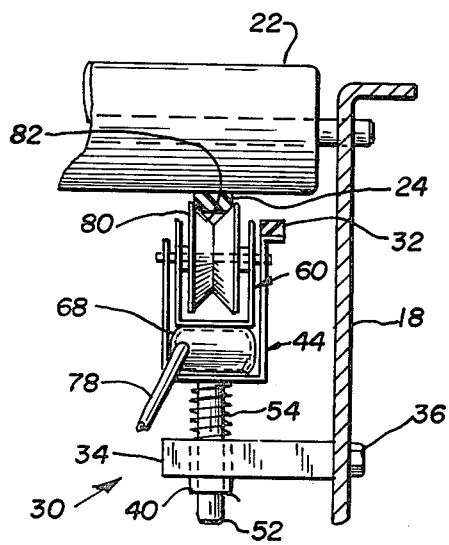
FIG. 7 is an enlarged partial view in elevation of another embodiment of a propelling and braking apparatus according to the principles of the present invention, in its propelling mode.
Figure 8:
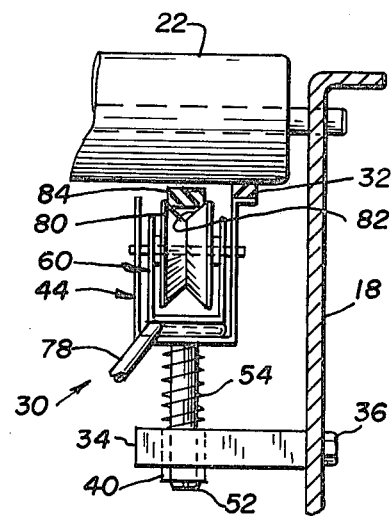
FIG. 8 is a view similar to that shown in FIG. 7 with the apparatus in its braking mode.

The alternate embodiment disclosed in FIGS. 7 and 8 is similar to the embodiments disclosed earlier, with the exception that the pulley 80 is provided with a V-shaped peripheral groove 82 which is adapted to receive a V-belt 84 therein. Here again, the endless V-belt 84 is driven from a power source, not shown, in a conventional manner, and provides the frictional contact between the article supporting rollers 22 and the pulley 80. A braking material 32 is provided on the U-shaped bracket 44 as in the earlier embodiments. The expansible tube 68 is included between the bottom portions of the U-shaped brackets 44 and 60 as in the earlier embodiments described.

Figure 9:
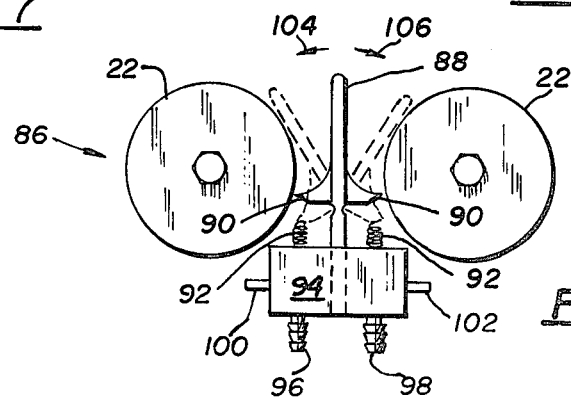
FIG. 9 is an enlarged view in elevation of a reversible article detecting sensor disposed between two article supporting rollers.
Figure 10:
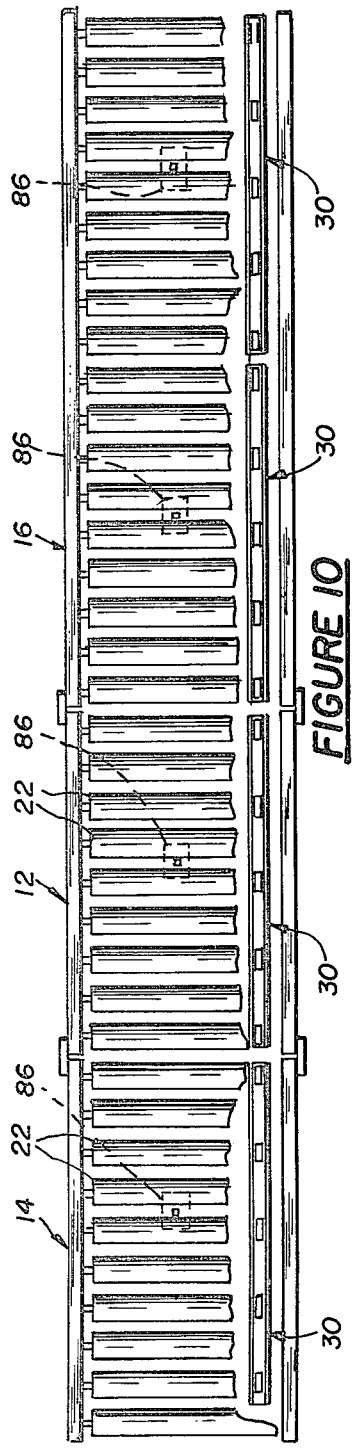
FIG. 10 is a top plan view of a zero pressure accumulator conveyor showing a plurality of sections connected in tandem and the location of the reversible article detecting sensors.

A reversible article detecting sensor 86 is disclosed in FIG. 9. The sensor 86 is mounted in a conventional manner and suspended between a pair of article supporting rollers 22 of an accumulator conveyor system 10 as shown in FIG. 10. The reversible article detecting sensor 86 is provided with a sensing arm 88 which may be deflected in either direction by an article traveling on the article supporting rollers 22. At the lower extremity of sensing arm 88 an extending protusion 90 is provided on both sides thereof, which is adapted to come into contact with the resilient plunger member 92 provided in the housing 94 of the sensor 86. The housing 94 is divided into two separate halves which are identical and function in the same manner. One-half of the housing is utilized when driving the article supporting rollers in one direction and the other half is utilized when driving the article supporting rollers in the opposite direction. The sensing arm 88 therefore, will be moved in a direction of an article trveling on the article supporting rollers. Compressed fluid, such as air, is coupled into the input port 96 from a pressurized fluid source 99 shown in FIG. 11. A second input port 98 is provided in the housing 94 of the sensor 86. Two output ports 100 and 102 are also provided in housing 94. When arm 88 is deflected to the left as indicated by arrow 104 the pressurized fluid which is normally entering through input port 96 and exiting through output port 100 is cut off therefrom and the air is permitted to leak out of an exit or leakage opening provided and co-existent with the resilient plunger member 92 in a conventional manner. A deflection of arm 88 in the direction of arrow 106 would cause protusion 90 to act upon the resilient plunger member 92, thereby cutting off the compressed fluid which normally enters input port 98 and exits output port 102, and would provide an exit or leakage path for the air via an opening provided therewith. The operation of a floating ball valve such as required for the article detecting sensor 86 is well known in the art.

FIG. 10 discloses an accumulator conveyor system which includes a plurality of driven propelling and braking apparatuses 30 mounted thereon. The sections 12, 14 or 16 of the conveyor 10 may include one or more driven propelling and braking apparatuses as desired and would depend upon the length of the conveyor and the size of the articles to be propelled thereon. The physical length of the propelling and braking apparatus may also be increased and decreased in size, depending upon the amount of braking required and the size of the article to be propelled on the conveyor system. The location of the reversible article detecting sensor is shown to be positioned approximately in the center of each of the propelling and braking apparatuses 30. Each sensor 86 is operatively coupled, via the input port thereof 96 and 98, to an electrically operated valve solenoid 110 which is energized from a control switch 112. The solenoid 110 is connected, via an air line 114, to the source of pressurized fluid 98, which preferably is air. Each of the output ports 100 and 102 of the sensor 86 is connected to an expansible tube located in a propelling and braking apparatus directly upstream from the activated sensor.

If the forward button 116 is depressed on control switch 112, the solenoid 110 will be energized in a manner which permits the pressurized fluid from the pressurized fluid source 99 to flow, via line 118, into input port 96 of sensor 86 and exit the output port 100 and flow, via line 120, to expansible tube 68, thus permitting the expansible tube 68 to expand. When the expansible tube 68 expands, it causes the U-shaped brackets 44 and 66 to move apart, as is shown in FIGS. 3, 5 and 7. The pulleys 28, 70 and 80 would move in an upward direction, causing the driving belts 26, 76 and 84 to come into intimate frictional contact with the article supporting rollers 22. The belts 26, 76 and 80 being endless and driven from an external source, not shown, would cause the article supporting rollers to rotate and thus move any article appearing thereon, to move in a direction of rotation, which let us assume, is in the direction of arrow 122, as shown in FIG. 11.

The expansion of the expansible member 68 causes the simultaneous movement of all the pulleys in an upward direction, thereby insuring intimate contact between the driving belts and the article supporting rollers simultaneously. When an article moving on the conveyor reaches the arm 88 of the article detecting sensor 86, it will deflect it in the direction of arrow 104, as shown in FIG. 9, thereby cutting off the air from the pressurized source to expansible member 68. Permitting the air to escape from expansible member 68, will cause the collapse thereof, permitting the U-shaped bracket 60 to move closer toward U-shaped bracket 44, as shown in FIGS. 4, 6 and 8. The resilient spring member 54 will urge the U-shaped bracket 44 in an upwardly direction, so that the braking material 32 will come into direct intimate contact with the article supporting rollers 22, applying simultaneous braking to a plurality of rollers, which will stop the rotation thereof and prevent the movement of an article on the conveyor.

It is to be noted that the sensor, although located in a first section, applies the braking to a section next upstream therefrom.

In the same manner, depressing the reverse button 124 on control switch 112 will activate the valve solenoid 110 and cause air from the pressurized source 99 to flow into line 126 in the direction of arrow 128. The pressurized fluid (air) will enter input port 98 and exit output port 102, which is connected, via a line 130, to the other compartment of the expansible member 68. Allowing the pressurized fluid into the other compartment of expansible 68 will cause the expansible member to expand, moving the driving belt 26, 76 and 84 into contact with the article supporting rollers 22. It is understood that pressing the reverse button on control switch 112 will also reverse the direction of the driving means, not shown, which causes the belts 26, 76, and 84 to be driven. Thus, the conveyor system as disclosed, is capable of operation in either a forward or reverse direction.

Depressing the off button on switch 112 will cause the driving means to be shut down, as well as closing off and bleeding the pressurized air flow by inactivating solenoid valve 110. This will automatically cause the resilient spring members 54 to urge the braking material 32 to come into contact with the rollers, thereby stopping the complete system and preventing any articles on the conveyor from moving.

Hereinbefore has been disclosed a reversible zero pressure accumulator and braking apparatus, which may be utilized on a conventional conveyor presently in use today. By utilizing a reversible article detecting sensor as disclosed, the conveyor may be driven in forward or reverse directions. A non-reversing article sensor and single pressure source without a control valve may readily provide article propulsion in one direction, and would require an expansible member having only a single air chamber.

It will be understood that various changes in details, materials, arrangement of parts and operating conditions which have been herein described and illustrated in order to explain the nature of the invention, may be made by those skilled in the art within the principles and the scope of the present invention.

Having thus set forth the nature of the invention, what is claimed is:

1. A zero pressure accumulator conveyor comprising:
   (a) a plurality of sections arranged in tandem, each section including a pair of side rails and a plurality of article supporting rollers at spaced intervals therebetween;
   (b) driving means including a combination driven propelling and braking apparatus operatively coupled to said article supporting rollers and disposed on one of said side rails;
   (c) a pressurized fluid source; and
   (d) an article detecting sensor disposed in each said section, said article detecting sensor being operatively coupled to said pressurized fluid source and said combination propelling and braking apparatus to either simultaneously engage the braking portion while disengaging the propelling portion or simultaneously engage the propelling portion while disengaging the braking portion of said combination propelling and braking apparatus from a plurality of said article supporting rollers by movement perpendicular to said article supporting rollers, said braking forces being applied only in a direction perpendicular to the axis of said article supporting rollers.

2. A zero pressure accumulator conveyor comprising:
   (a) a plurality of sections arranged in tandem, each section including a pair of side rails and a plurality of article supporting rollers at spaced intervals therebetween;
   (b) a pressurized fluid source; and
   (c) driving means including a combination driven propelling and braking apparatus operatively coupled to said article supporting rollers and disposed on one of said side rails, said propelling and braking apparatus including:
      (i) mounting means for affixing said apparatus to a side rail beneath said article supporting rollers,
      (ii) first U-shaped bracket means resiliently coupled to said mounting means, the arm portion of said first U-shaped bracket means being provided with apertures and extending upwardly towards said article support rollers and having braking means disposed on the distal end of at least one arm thereof,
      (iii) second U-shaped bracket means disposed within the opening of said first U-shaped bracket means and facing in the same direction, the arm portions of said second U-shaped bracket means being provided with elongated apertures,
      (iiii) roller means having an axle which is slidably received by said apertures and said elongated apertures, said roller means being operatively coupled to and in intimate contact with said driving means disposed between said roller means and said article supporting rollers, and
      (iiiii) expansible tube means disposed between the horizontal portions of said first and second U-shaped bracket means and operatively coupled to said article detecting sensor and said pressurized fluid source, said article detecting sensor controlling the ingress and egress of fluid from said expansible tube means, said expansible tube means causing said driving means to engage said article supporting rollers when containing fluid therein and causing said braking means to contact said article supporting rollers when said fluid is removed therefrom;
   (d) an article detecting sensor disposed in each said section, said article detecting sensor being operatively coupled to said pressurized fluid source and said combination propelling and braking apparatus to either simultaneously engage the braking portion while disengaging the propelling portion or simultaneously engage the propelling portion while disengaging the braking portion of said combination propelling and braking apparatus from a plurality of said article supporting rollers.

3. A zero pressure accumulator conveyor according to claim 2 wherein said mounting means includes a resilient member and a bearing having coaxial apertures therein for slidably receiving a support rod depending from the horizontal portion of said first U-shaped member.

4. A zero pressure accumulator conveyor according to claim 2 wherein said first U-shaped bracket means has braking means disposed on the distal ends of both arms thereof.

5. An accumulator conveyor according to claim 2 or 4 wherein said braking means is a friction material adhesively affixed to an extending portion provided on said distal end.

6. A zero pressure accumulator according to claim 2 wherein said elongated apertures are disposed in a vertical direction permitting said roller means axle to move closer to and away from said article supporting rollers.

7. A zero pressure accumulator according to claim 2 wherein said roller means includes a wheel journaled on said axle, said wheel being provided with a peripheral groove for receiving said driving means.

8. A zero pressure accumulator according to claim 2 wherein said driving means is a plastic coated metal cable.

9. A zero pressure accumulator according to claim 7 wherein said driving means is a flat belt with an extending protrusion for cooperating with said peripheral groove provided in said wheel.

10. A zero pressure accumulator according to claim 7 wherein said driving means is a V-shaped belt.

11. A zero pressure accumulator according to claim 2 wherein said driving means is an endless driven belt.

12. A zero pressure accumulator according to claim 2 wherein said expansible tube means is a single tube having two independent fluid paths therein and said article detecting sensor is reversible.

13. In a zero pressure accumulator conveyor having a plurality of sections arranged in tandem, each section including a pair of slide rails and a plurality of article supporting rollers at spaced intervals therebetween, an article detecting sensor located in each said section, operatively coupled to a pressurized fluid source and driving means, the improvement comprising, affixing a combination driven propelling and braking apparatus to a section operatively coupled to said article supporting rollers, said combination propelling and braking apparatus including:

(a) mounting means for affixing said apparatus to a side rail beneath said article supporting rollers;

(b) first U-shaped bracket means resiliently coupled to said mounting means, the arm portion of said first U-shaped bracket means being provided with apertures and extending upwardly towards said article support rollers and having braking means disposed on at least one arm thereof;

(c) second U-shaped bracket means disposed within the opening of said first U-shaped bracket means and facing in the same direction, the arm portions of said second U-shaped bracket means being provided with elongated apertures;

(d) roller means having an axle which is slidably received by said apertures and elongated apertures, said roller means being operatively coupled to and in intimate contact with said driving means disposed between said roller means and said article supporting rollers; and (e) expansible tube means disposed between the horizontal portions of said first and second U-shaped bracket means and operatively coupled to said article detecting sensor and said pressurized fluid source, said article detecting sensor controlling the ingress and egress of fluid from said expansible tube means, said expansible tube means causing said driving means to engage said article suporting rollers when containing fluid therein and causing said braking means to contact said article supporting rollers when said fluid is removed therefrom.

14. A zero pressure accumulator according to claim 13 wherein said mounting means includes a resilient member and a bearing having coaxial apertures therein for slidably receiving a support rod depending from the horizontal portions of said first U-shaped member.

15. A zero pressure accumulator according to claim 13 wherein said elongated apertures are disposed in a vertical direction permitting said roller means axle to move closer to and away from said article supporting rollers.

16. A zero pressure accumulator according to claim 13 wherein said roller means includes a wheel journaled on said axle, said wheel being provided with a peripheral groove for receiving said driving means.

17. A zero pressure accumulator according to claim 13 wherein said driving means is an endless driven belt.

18. A zero pressure accumulator according to claim 13 wherein said tube means is a single tube having two independent fluid paths therein.

* * * * *